United States Patent
Adler

(10) Patent No.: US 7,071,943 B2
(45) Date of Patent: Jul. 4, 2006

(54) SYSTEM AND METHOD FOR VISUAL FEEDBACK OF COMMAND EXECUTION IN ELECTRONIC MAIL SYSTEMS

(75) Inventor: Yaron Adler, Tel Aviv (IL)

(73) Assignee: IncrediMail, Ltd., Tel Aviv (IL)

( * ) Notice: Subject to any disclaimer, the term of this patent is extended or adjusted under 35 U.S.C. 154(b) by 486 days.

(21) Appl. No.: 10/333,666

(22) PCT Filed: Jul. 18, 2001

(86) PCT No.: PCT/IL01/00661

§ 371 (c)(1),
(2), (4) Date: Jun. 5, 2003

(87) PCT Pub. No.: WO02/07452

PCT Pub. Date: Jan. 24, 2002

(65) Prior Publication Data

US 2004/0004613 A1 Jan. 8, 2004

Related U.S. Application Data

(60) Provisional application No. 60/219,227, filed on Jul. 18, 2000.

(51) Int. Cl.
*G06T 13/00* (2006.01)
(52) U.S. Cl. ..................................... 345/473
(58) Field of Classification Search ................ 345/419, 345/473, 474, 475; 348/594
See application file for complete search history.

(56) References Cited

U.S. PATENT DOCUMENTS

| | | | | |
|---|---|---|---|---|
| 5,463,725 A | * | 10/1995 | Henckel et al. | 715/776 |
| 5,544,295 A | * | 8/1996 | Capps | 345/473 |
| 6,137,489 A | | 10/2000 | Ohishi et al. | 345/339 |
| 6,331,861 B1 | | 12/2001 | Gever et al. | 345/629 |
| 6,466,213 B1 | | 10/2002 | Bickmore et al. | 345/473 |
| 6,512,522 B1 | * | 1/2003 | Miller et al. | 345/474 |
| 6,839,411 B1 | * | 1/2005 | Saltanov et al. | 379/88.13 |

OTHER PUBLICATIONS

Sender-Specified Multimedia Executable Object for Recipient Alert, IBM Technical Disclosure Bulletin, Apr. 1993, vol. 36, No. 4, pp. 247-248.

* cited by examiner

*Primary Examiner*—Richard Hjerpe
*Assistant Examiner*—Andrew Yang
(74) *Attorney, Agent, or Firm*—Brown Raysman Millstein Felder & Steiner LLP

(57) ABSTRACT

The present invention is a method and system for visually informing a user that an email client has executed a desired command. The method comprises calculating an area within the email client that displays text of a message and mapping an identically sized set of texture mapped polygons to the area within the email client displaying the text of the message. The set of polygons texture mapped with a texture representing the text of the message. The invention further comprises displaying the texture mapped polygons on top of the text of the message, animating the texture mapped polygons in response to a particular command a user wishes to execute; and removing the texture mapped polygons from the area within the email client displaying the text of the message.

12 Claims, 24 Drawing Sheets

SYSTEM AND METHOD FOR VISUAL FEEDBACK OF COMMAND EXECUTION IN ELECTRONIC MAIL SYSTEMS

This application claims the benefit of Provisional Application No. 60/219,227, filed Jul. 18, 2000.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to visual feedback of command execution in computer systems. More particularly, the present invention relates to the 3D animation of electronic mail messages in response to different actions performed on the messages, such as sending, receiving, deleting, browsing, etc. Electronic mail, or email, is an increasingly popular medium used by people to communicate with one another. Using email, a person can send messages and other information electronically across a computer network to other email users. Information that can be attached to email messages includes: pictures, sound recordings, formatted documents, and virtually any other content that is in digital form. Email communication systems can be described as a multicast store-and-forward communications system, allowing users to send messages to one or more recipients at a time. Most systems can further be described as bi-directional, as they usually allow a user to both send and receive messages.

When using email to communicate, a user will typically create a message using electronic mail client software running on a computer that is connected by a network to other computers. Alternatively, the user's computer can be connected to the network on demand, such as through the use of a modem in conjunction with a dial-up account at an Internet Service Provided (ISP). In addition to the substantive contents, the message will include the network address of the intended recipient. When the user has finished composing the message, it is electronically transmitted via a network to its intended recipient. The recipient, also running email client software on a computer connected to a network, receives the message and can examine its contents.

A common computer network used to send and receive email is the Internet. The Internet allows users to exchange email with other users located throughout the world. Typically, each user will have an Internet email address that is unique to the particular user. The syntax of Internet mail addresses is username@domainname, e.g., mark@prodigy.com. A user with an email account and a computer capable of connecting to the Internet can easily be configured to send and receive messages over the network.

In many existing email client systems, a hierarchy of folders is used to manage messages. Typically, an "Inbox" holds received messages and an Outbox holds completed messages that have not yet been sent. Other standard folders include a "Sent Items" folder containing messages that have already been sent to their intended recipients, a "Deleted Items" folder holding received messages that have been deleted, and a "Draft" folder holding unfinished messages that have been saved for completion at a later time. The user is free to create additional folders to manage messages according to his or her specific needs.

The only indication to the user that an action has been performed on an email message is a change in the contents of the various folders. For example, when a user decides to view either the next or previous message in a folder, the execution of either one of these commands will simply display the next or previous message. Likewise, executing the delete message command will remove a message from the Inbox or folder that it currently resides in and move it to a Deleted Items folder. Unfortunately, current systems provide no indication as to exactly which command was indeed executed. Because the visual feedback provided by the system to indicate that commands have been executed is nearly identical, careful attention is required on the part of the user to make sure actions have been performed successfully or that the correct action was performed.

There is thus a need for a system that provides a robust indication to the user that a command has been executed. The present invention satisfies this need with a system that performs 3D visual animations representing the execution of user commands, with the animation performed on the email itself. Each command is provided with a different animation representative of the command. The visual representation of commands helps the user understand exactly which command has been executed. Additionally, the animation of the email itself supplies a new level of interactivity that helps make working with email systems less tedious and more enjoyable.

BRIEF SUMMARY OF THE INVENTION

It is an object of the present invention to overcome the above-described inherent limitations of email systems.

It is another an object of the present invention to visually alert a user that a command has been executed.

It is another object of the present invention to visually inform the user that a command has been executed by animating the body of a message in response to the particular command.

It is still another object of the present invention to provide a user with the ability to associate different animations with different commands.

Some of the above and other objects of the present invention are achieved by a 3D animation system composed of three parts: the animated body, a texture mapping applied to the animated body, and the transformation of the animated body over a predefined timeline. In order to achieve the effect of an animated email message, the area within the email client that displays the text of the message, or message body, is calculated. The contents of this area are mapped to an identically sized set of polygons representing the animated email. The texture mapped polygons are then displayed within a frameless window on top of the body of the email message. The polygons are animated in response to the particular command the user wishes to execute. The texture-mapped polygons are removed from the visible area of the screen after the animation has finished, creating a seamless transition between the animated and normal representation of the email message. Processing control is then returned to the email client software, allowing the user to execute additional commands and continue manipulating email messages.

Some examples of email animations are a message flying out into space to represent the sending of a message, animating a message to appear as a page turning in a book to represent browsing through a series of messages, and shredding or crumbling a message to represent deleting a message. To enhance the effect, an appropriate sound effect can be added to the animation, such as the sound of crumpling paper or a paper shredder.

The set of animations need not be fixed. Functionality is provided that allows a user to select among a series of different animations according to personal preferences. For example, a baseball fan can select an animation of a message being hit out of a ballpark. Users can allow the system to randomly associate messages with different animations, thus adding a surprise factor to the experience. New animations may also be added to the system, e.g., by loading them from a CD-ROM or by downloading them from the Internet.

BRIEF DESCRIPTION OF THE DRAWINGS

The invention is illustrated in the figures of the accompanying drawings, which are meant to be exemplary and not limiting, in which like references are intended to refer to like or corresponding parts, and in which.

DETAILED DESCRIPTION OF THE PREFERRED EMBODIMENTS

Figure 1:
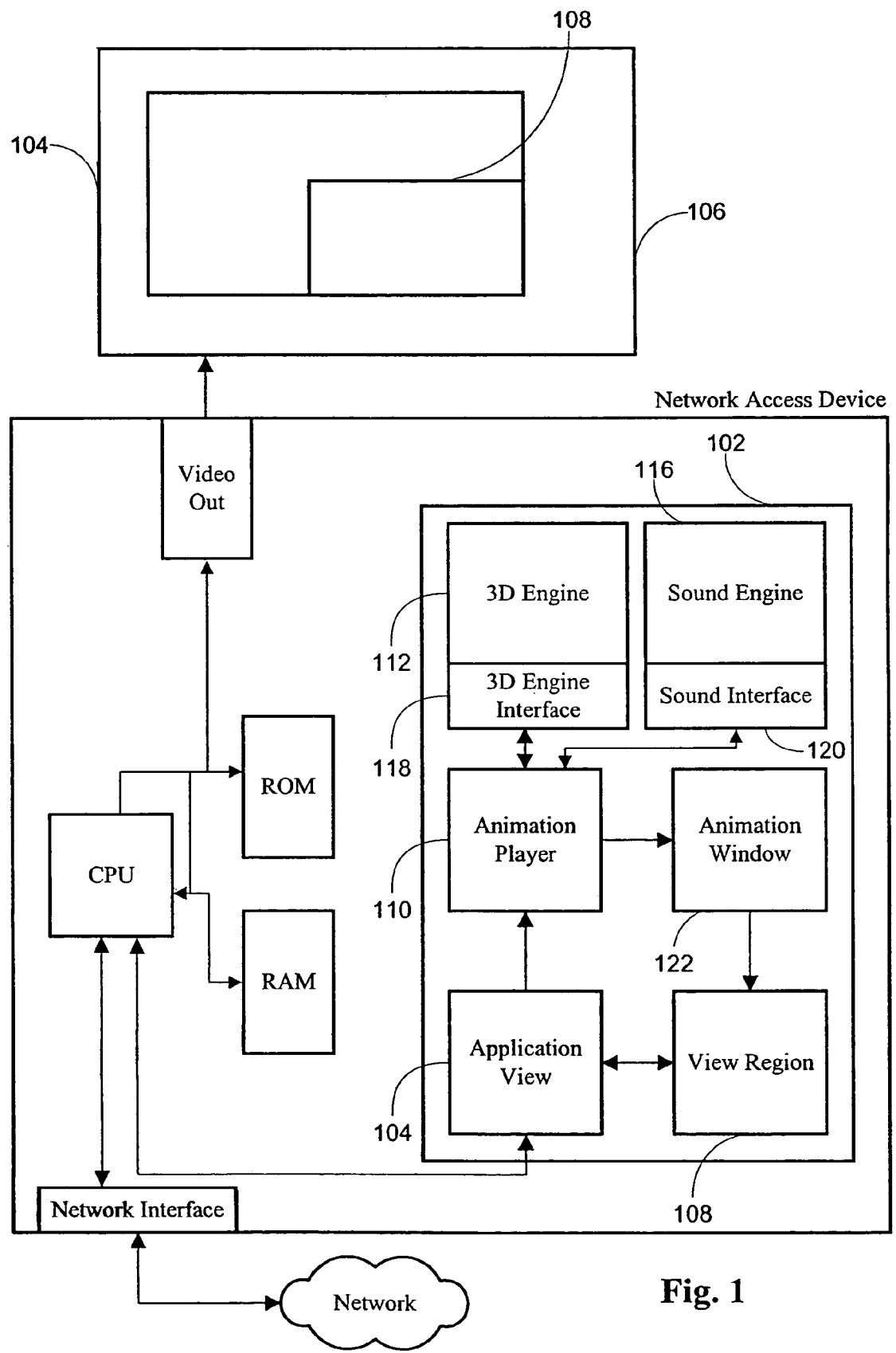
FIG. 1 is a block diagram of the software components that comprise the email animation system according to one embodiment of the present invention.

With reference to FIG. 1, one embodiment of the software components that interact to create an animated response to the execution of user commands is presented. The software components are stored on a digital storage device, such as a hard disk or similar mass storage device 102. The application view 104 is the email client software that is presented on a display device, such as a television or computer monitor 106. For example, the application view provided by the Microsoft Outlook email client includes all the controls and screen elements that comprise the application. When the application is used to manipulate an email message, the message typically appears in a new window or within a separate frame within the email client. The area used to display the body of the email message is referred to as the view region 108.

The storage device 102 also stores animation player software 110 that interacts with the view region 108 to control the animation of an email message. The animation player 110 controls a 3D engine 112 and a sound engine 116. The two software engines, 112 and 116, render the graphics and sound necessary to conduct the animation. Software engines, such as these, that are used to manipulate 3D graphics and sound are well known in the art. As the each frame of the animation is rendered, it is passed off to the animation player 110 for presentation in real-time. Each engine, 112 and 116, has an associated interface, 118 and 120 respectively. The interface is an API that is used by the animation player 106 to issue commands to the 3D 112 and sound 116 engines. Exemplary 3D APIs are DirectX, created by Microsoft Corporation, and OpenGL, which is an open source 3D API. Essentially, the engines 112 and 116 perform the actions under the control of the animation player.

The 3D engine 112 and the sound engines 116 render a plurality of frames of animation with associated sound and pass the data off to the animation player 106. The animation player 110 generates a frameless animation window 122 that has dimensions identical to those of the view region 108 being animated. This window is used as a container to hold the animation being presented by the player 110. The animation window 122 is overlaid on, or replaces, the view region 108 and the animation is displayed. After the animation has completed, the window 122 is removed and the view region is once again visible. The view region 108 will now display an image that is appropriate to be displayed after the particular command has been executed. For example, if the user selects the next message command, the view region will display the text of the next message after the animation has completed and the animation window is removed.

Figure 2:
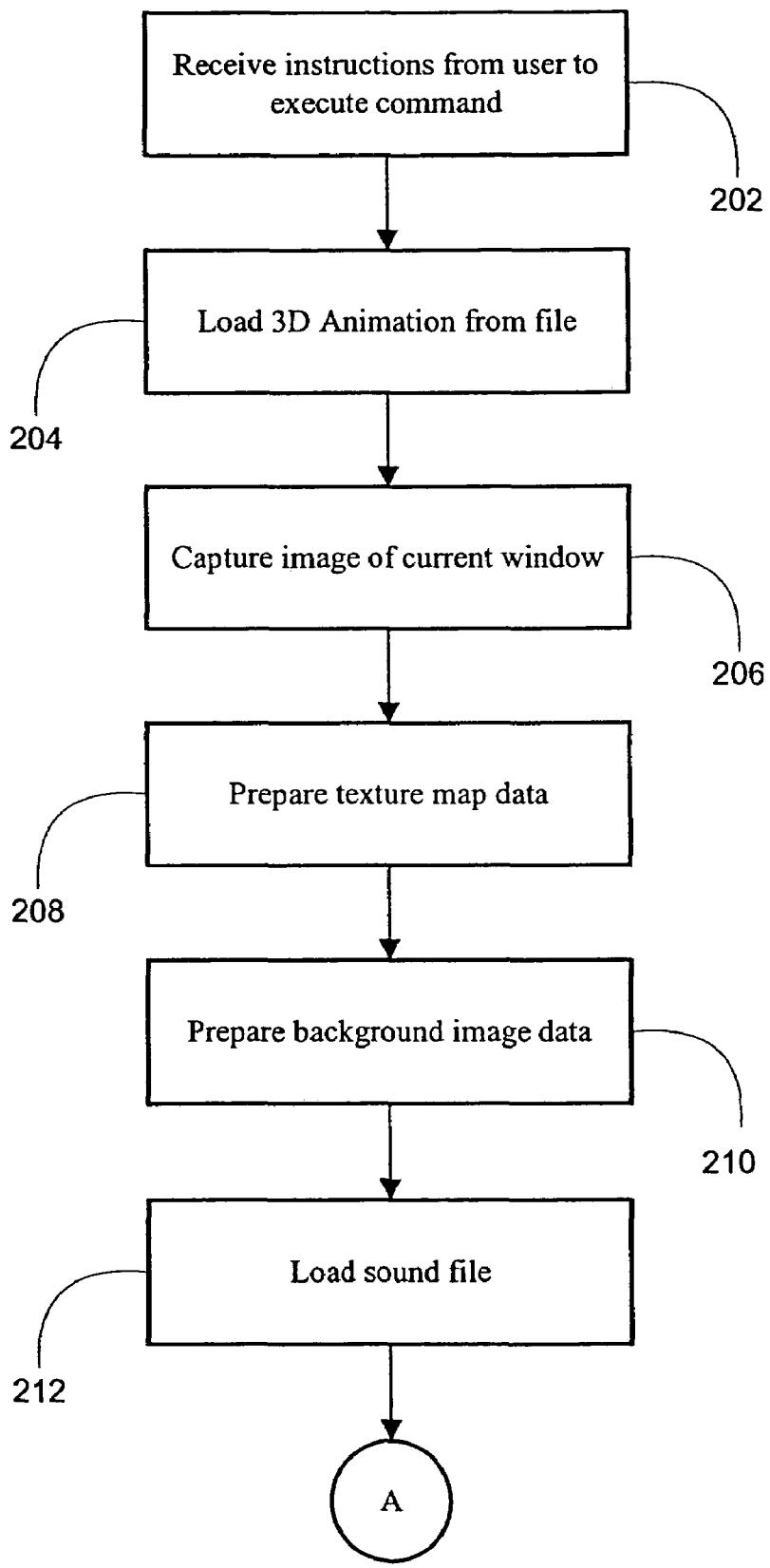
FIGS. 2 and 3 are a flow diagram presenting a method for animating email messages according to one embodiment of the present invention.
Figure 3:
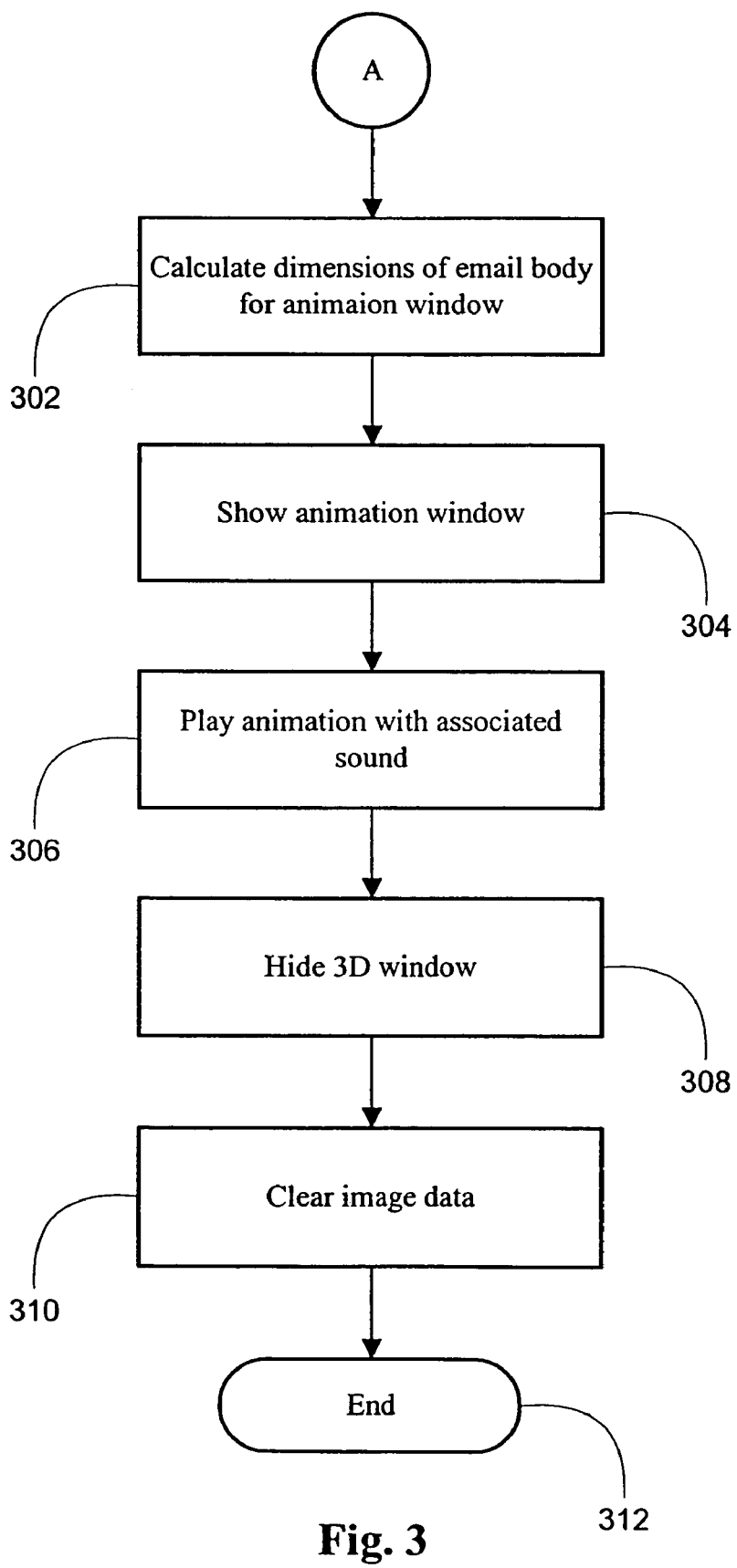
Figure 4:
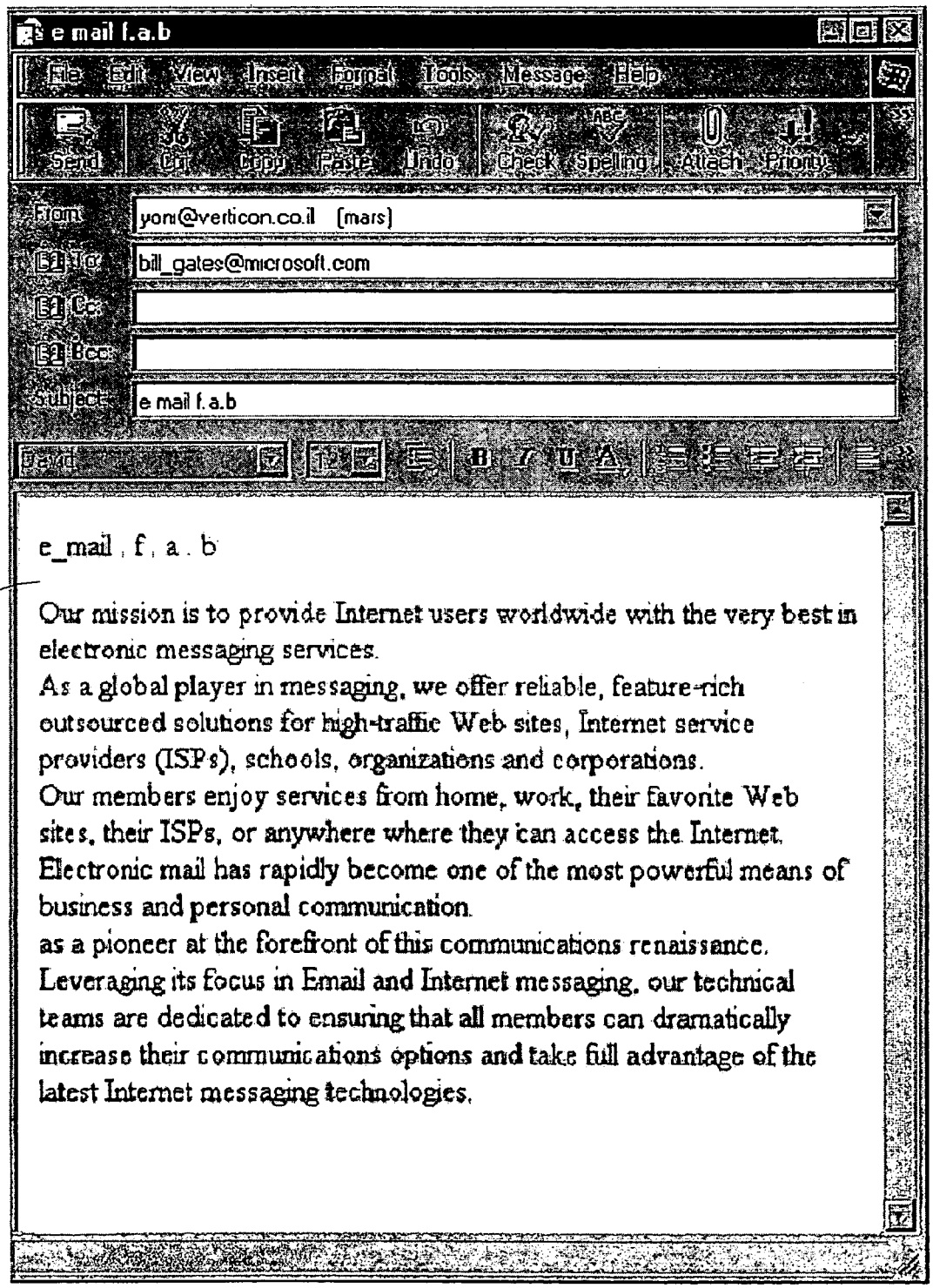
FIGS. 4 through 8 are a series of screen shots showing animation associated with executing the send message command according to one embodiment of the present invention.
Figure 5:
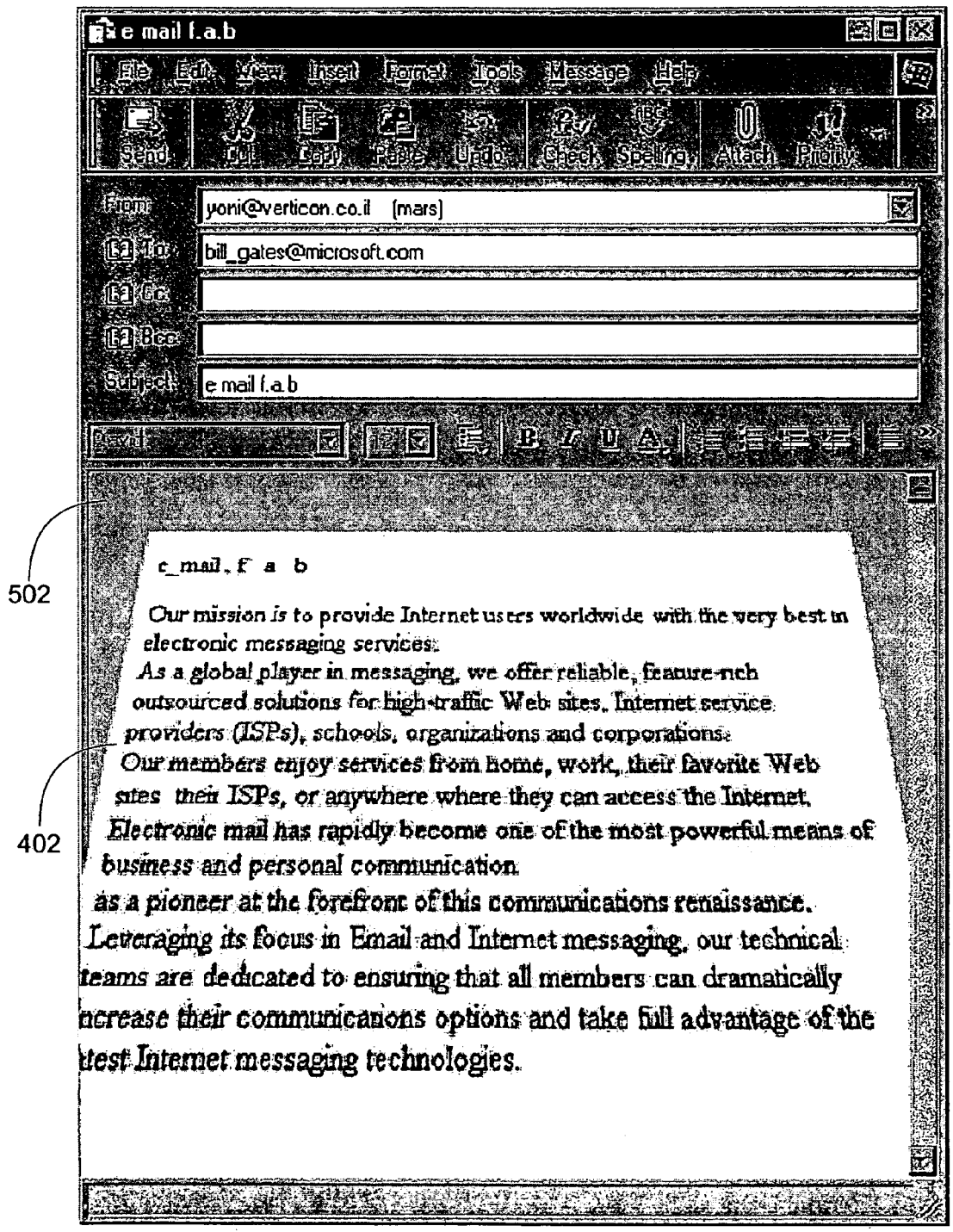
Figure 6:
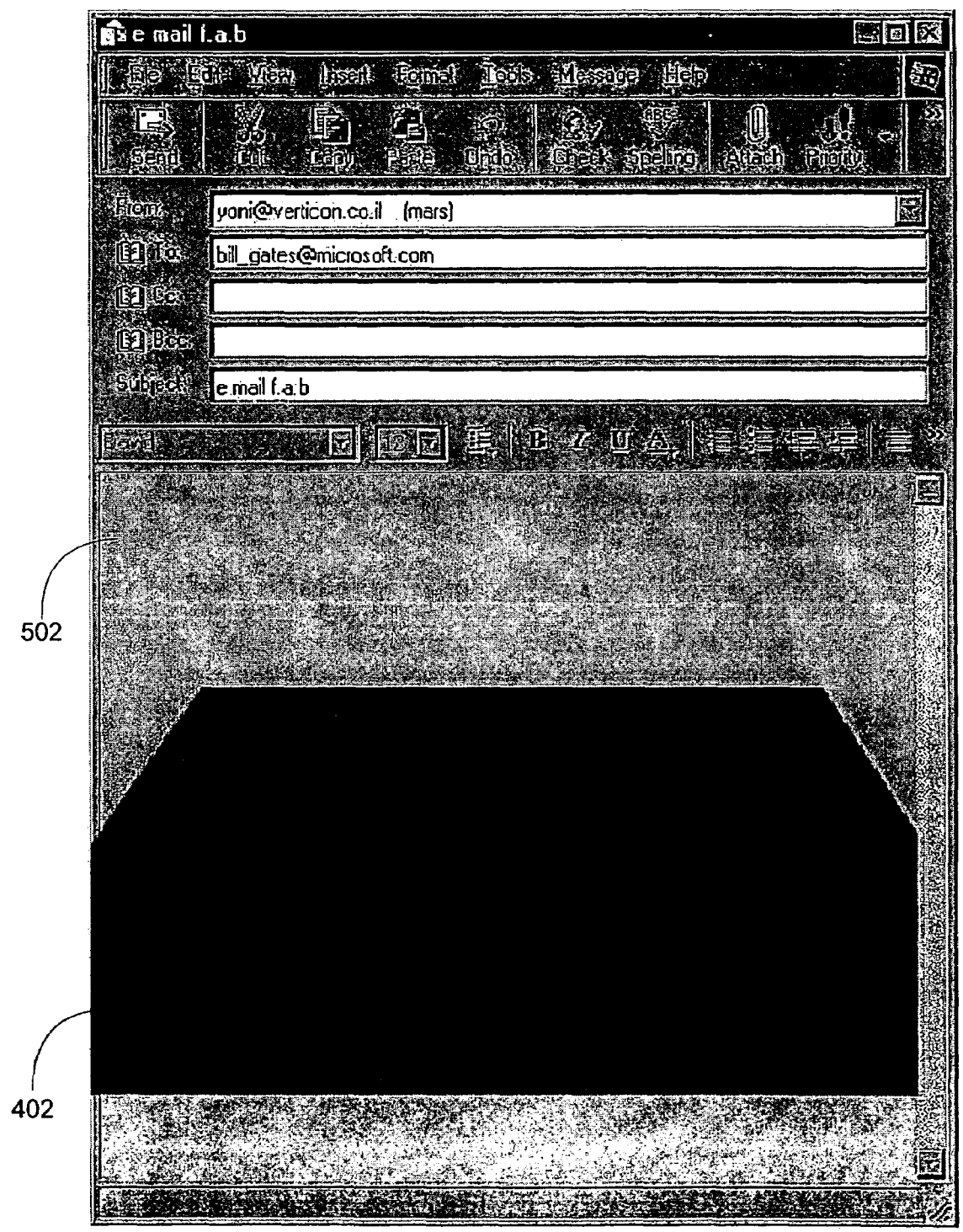
Figure 7:
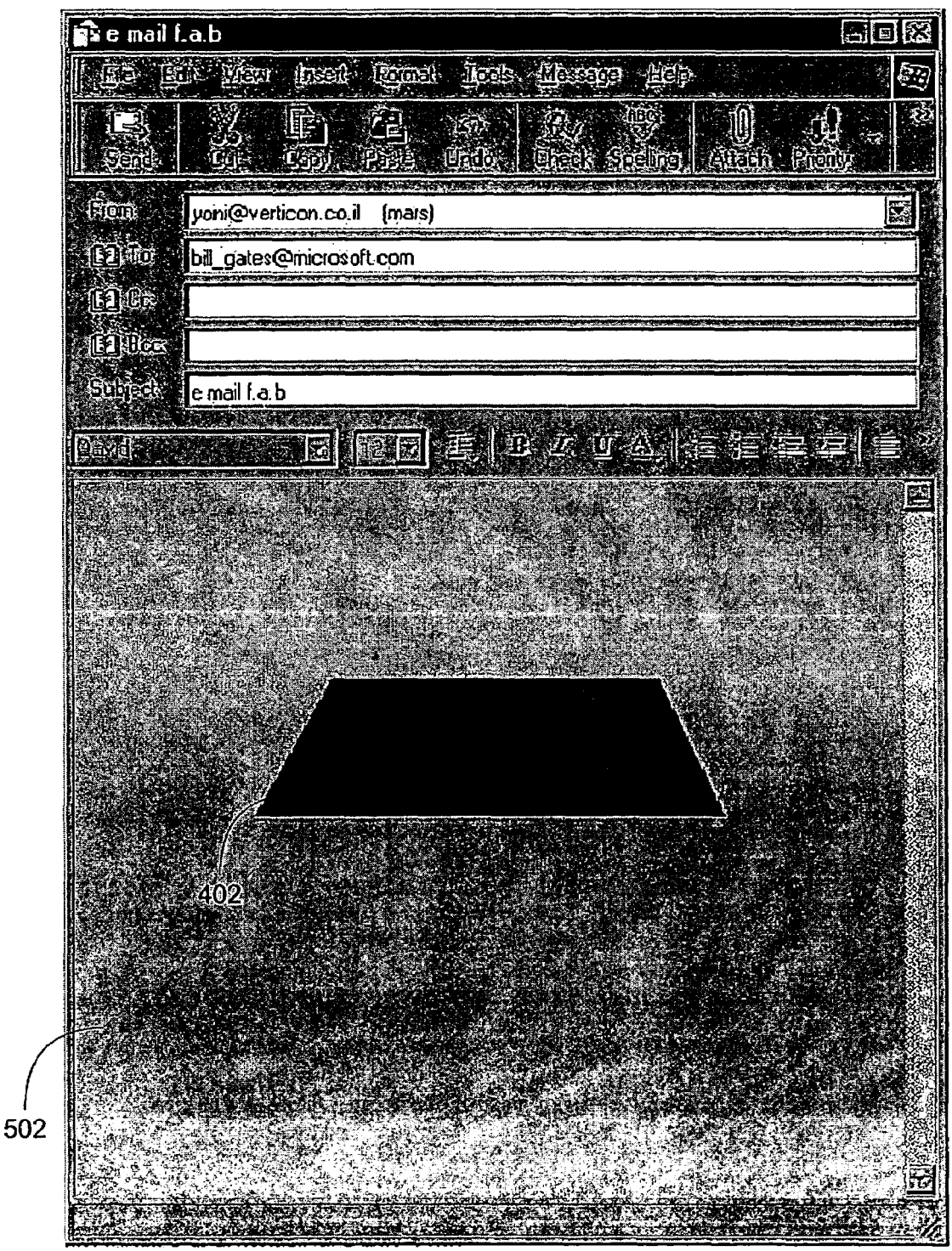
Figure 8:
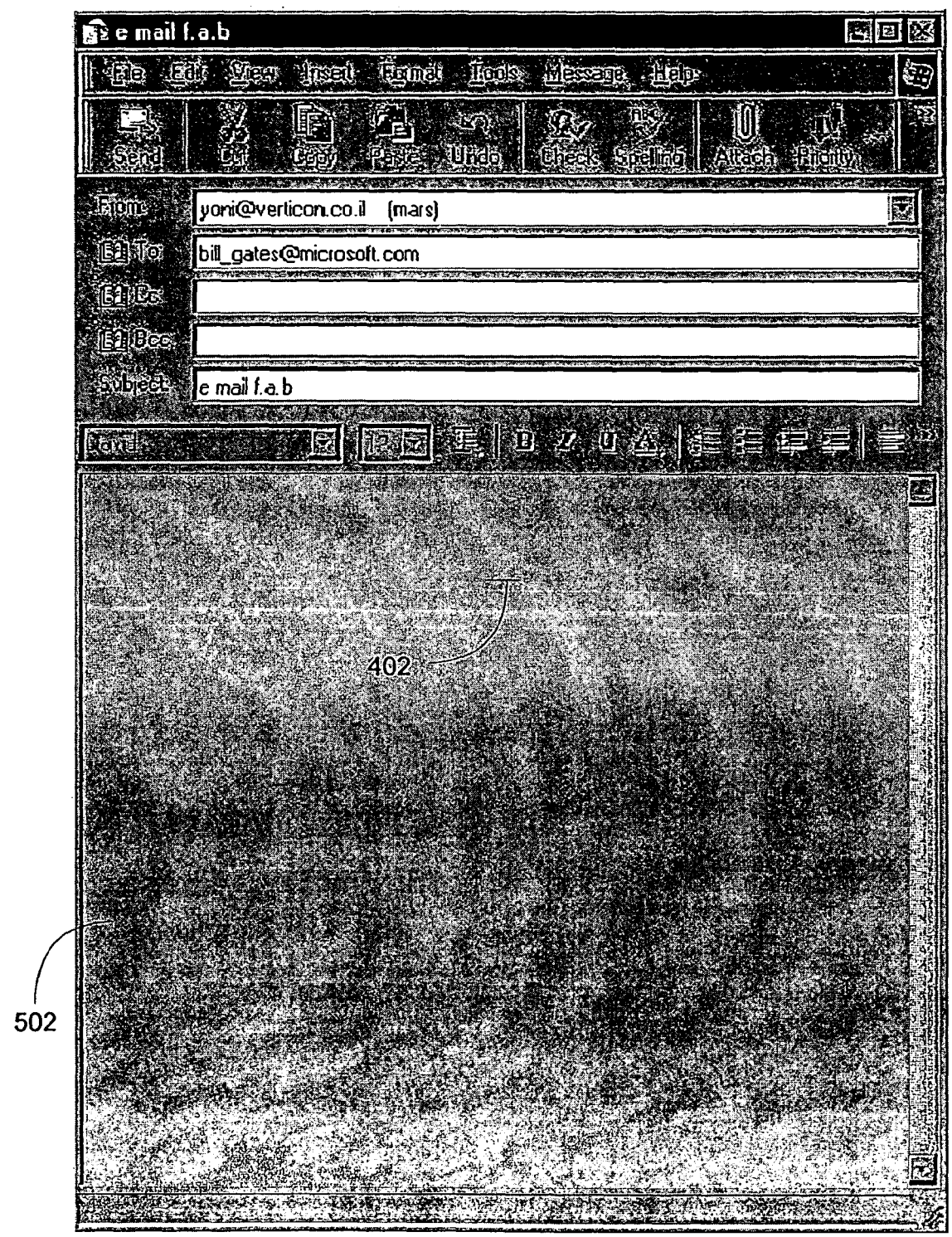
Figure 9:
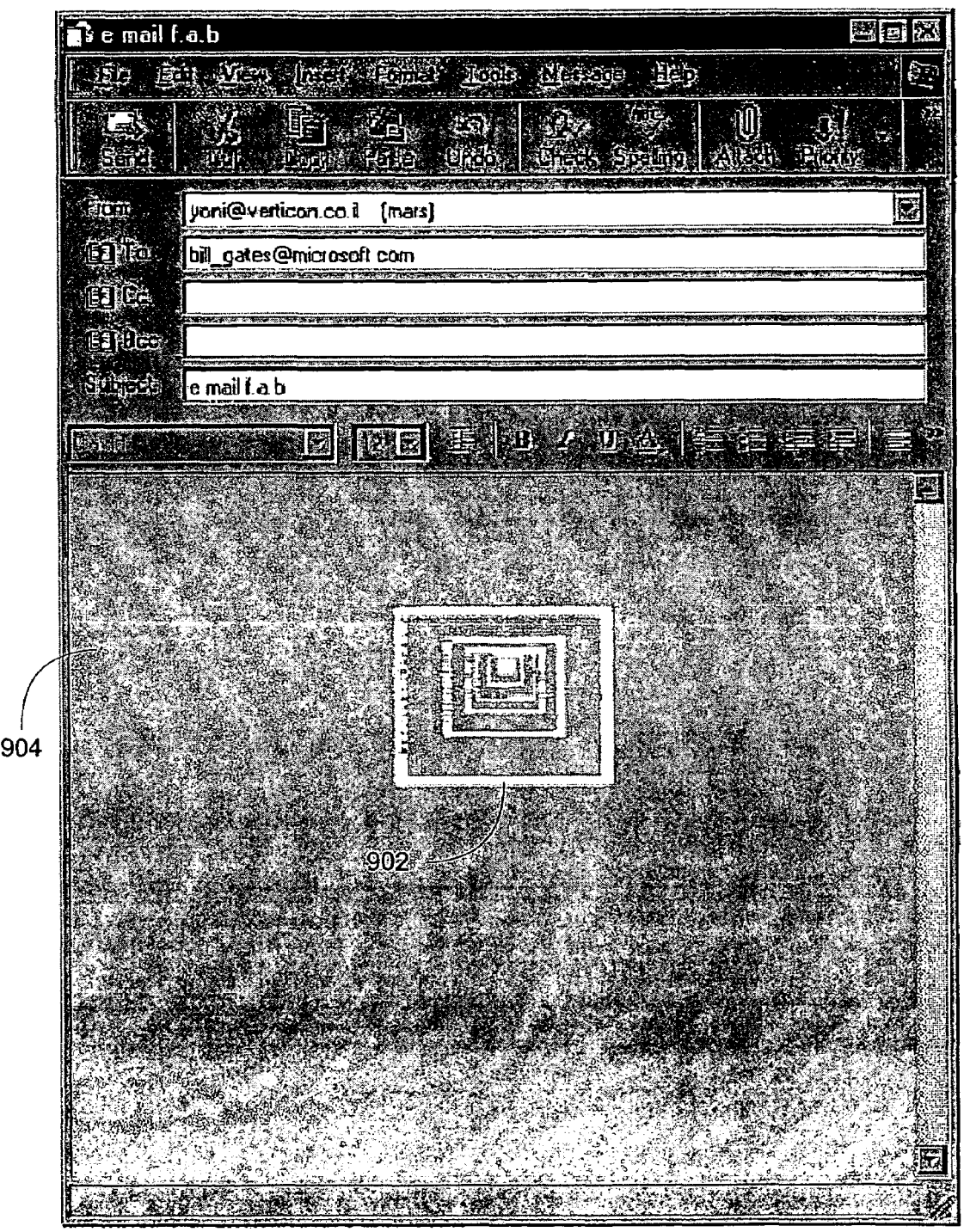
FIGS. 9 through 13 are a series of screen shots showing animation associated with executing the receive message command according to one embodiment of the present invention.
Figure 10:
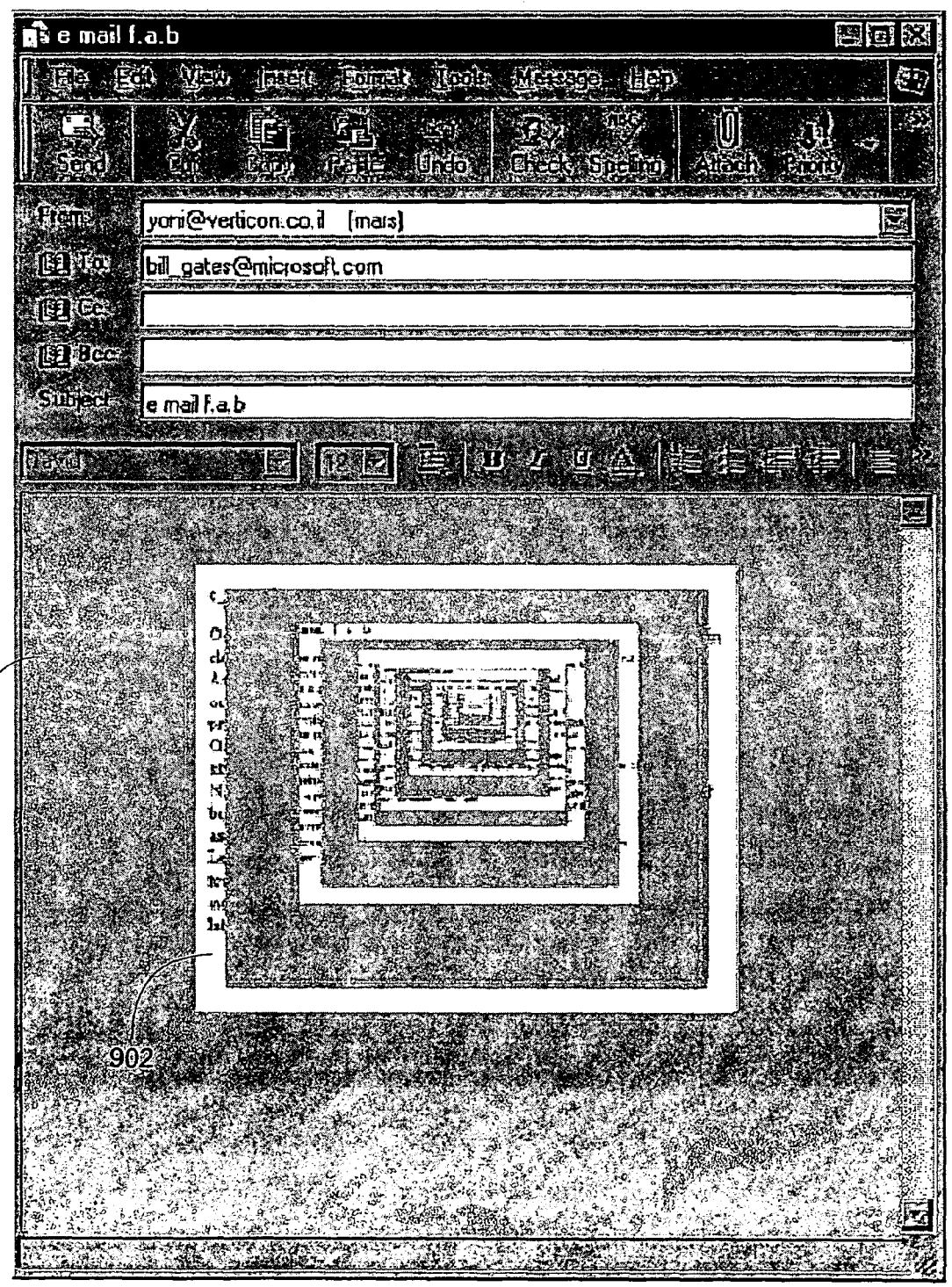
Figure 11:
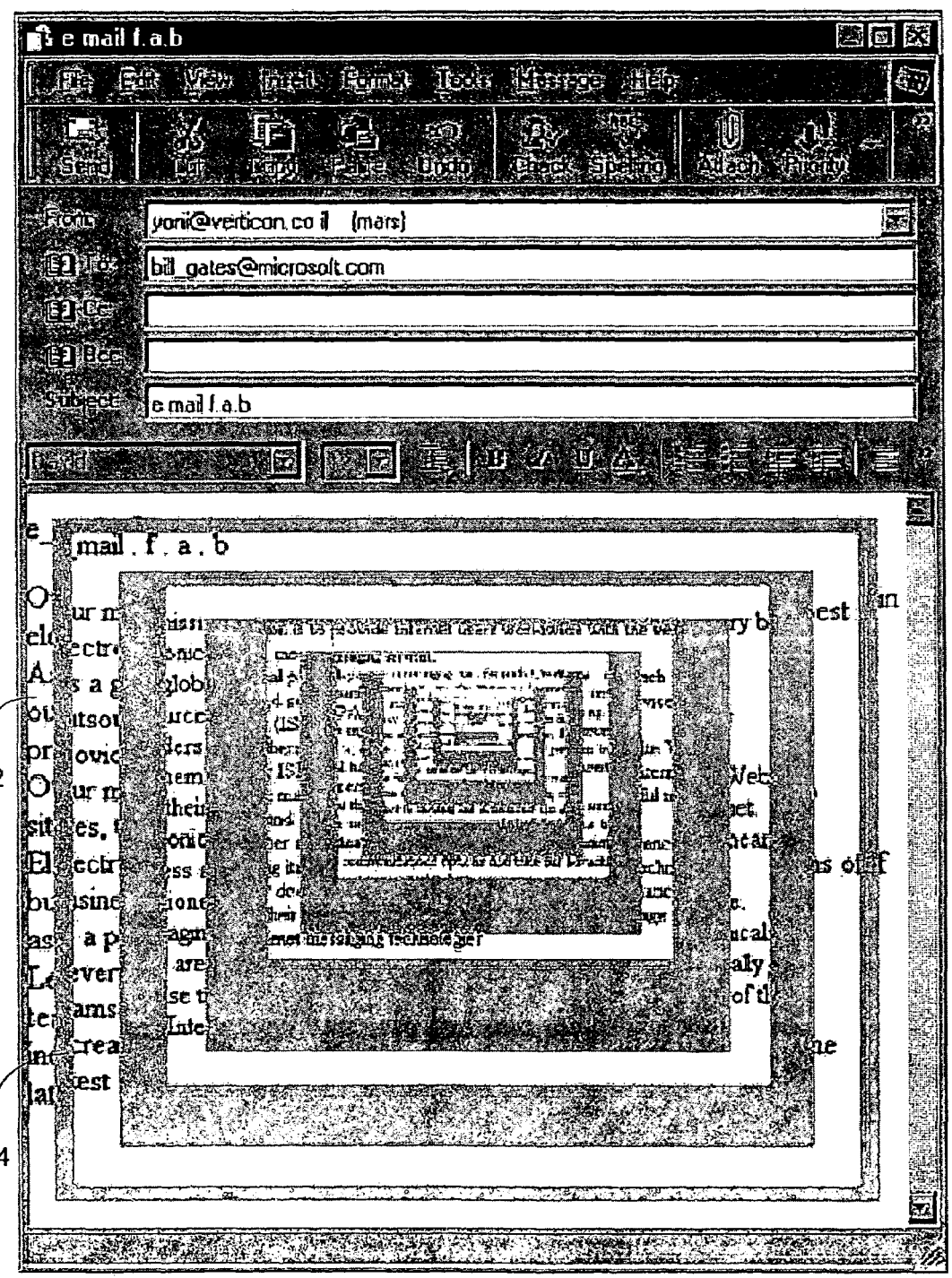
Figure 12:
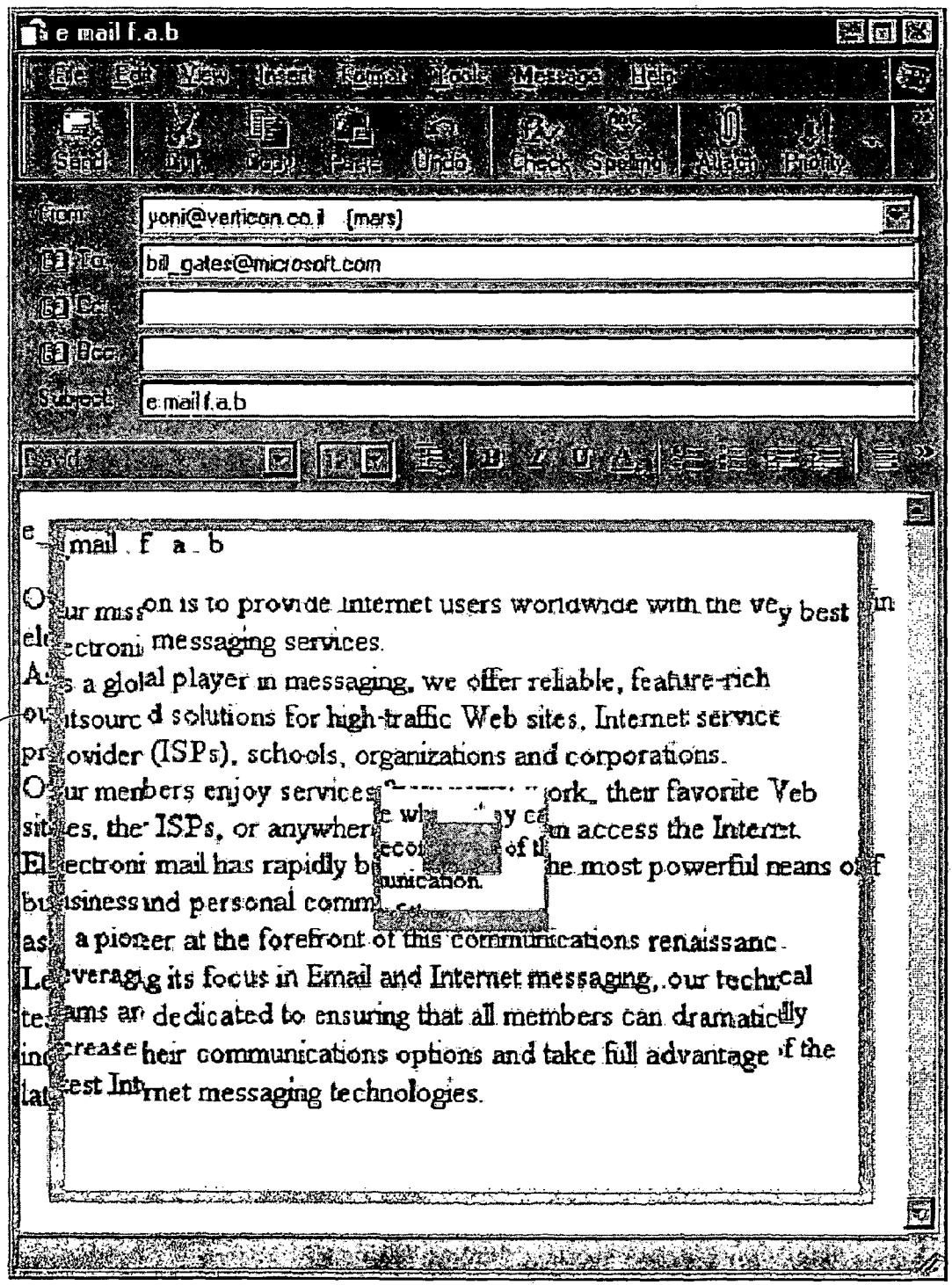
Figure 13:
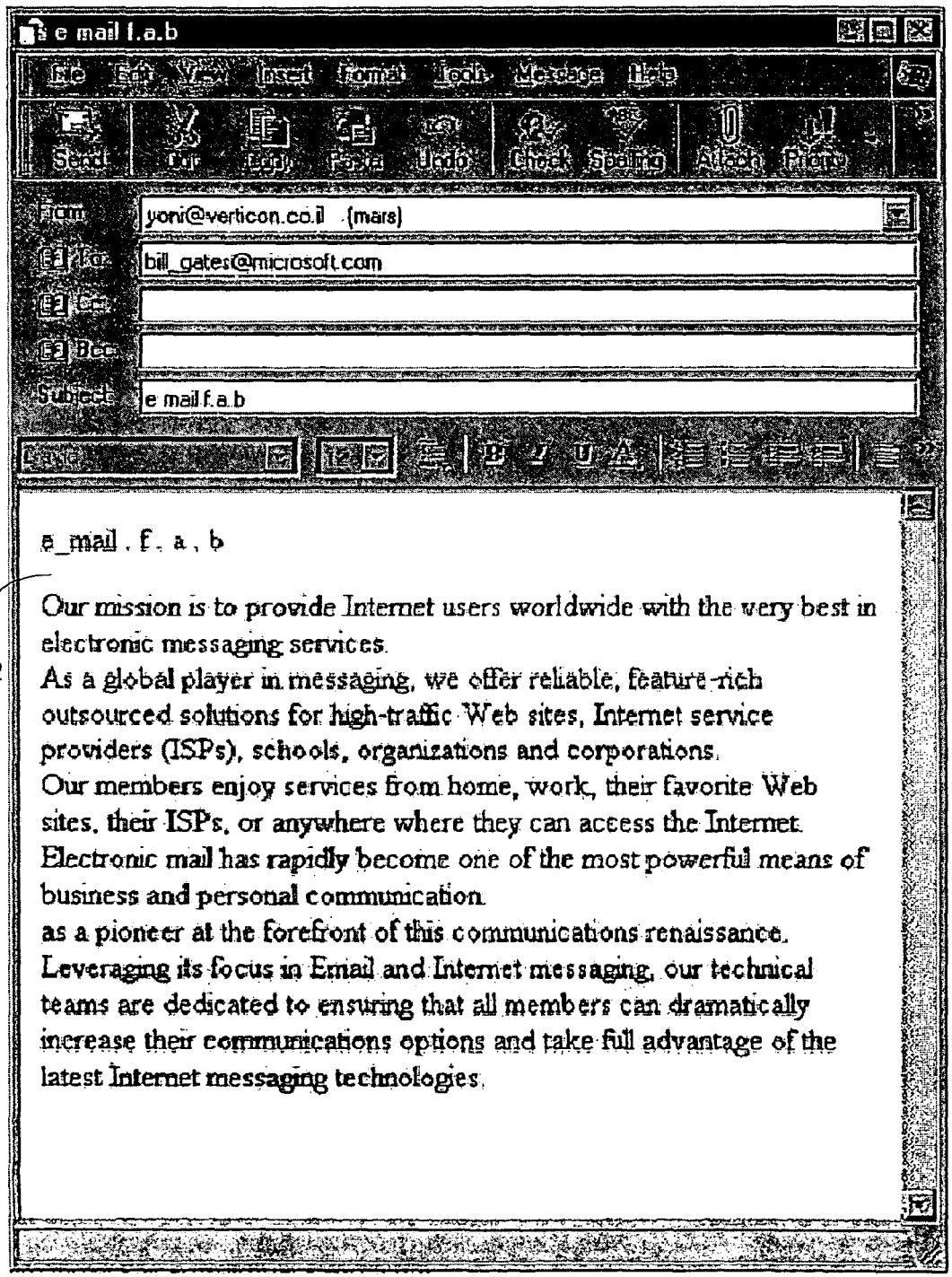
Figure 14:
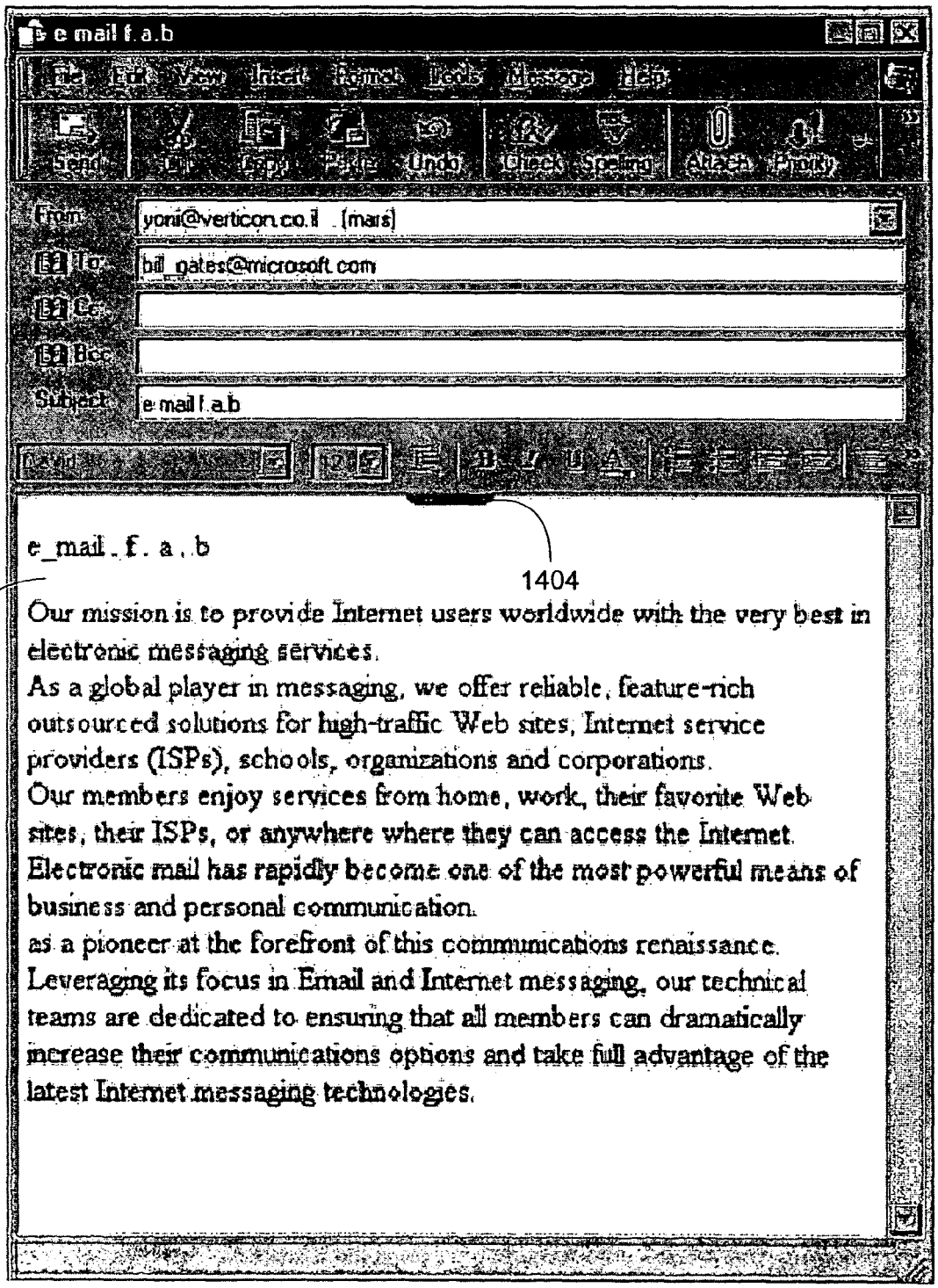
FIGS. 14 through 19 are a series of screen shots showing animation associated with executing the send message command according to one embodiment of the present invention.
Figure 15:
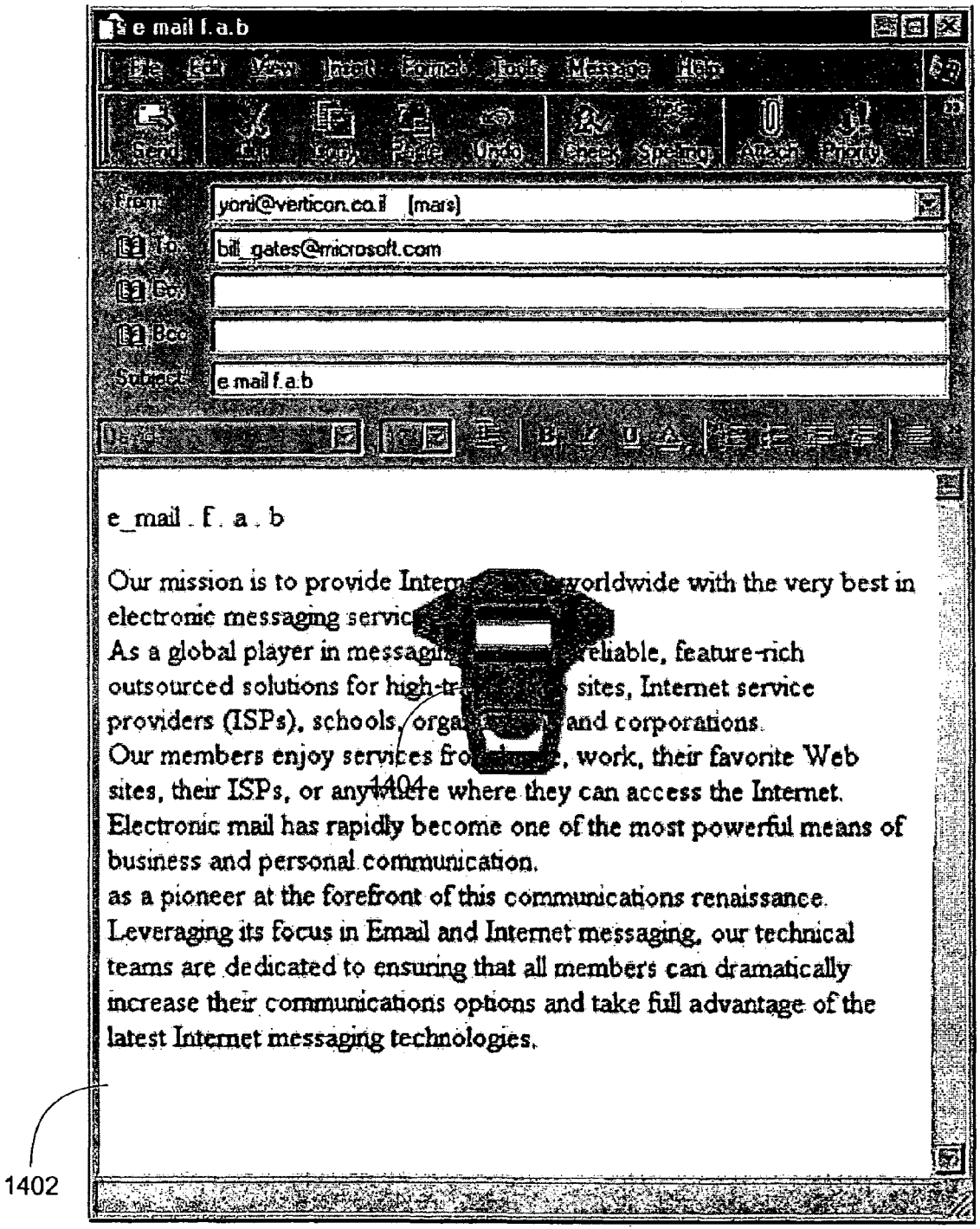
Figure 16:
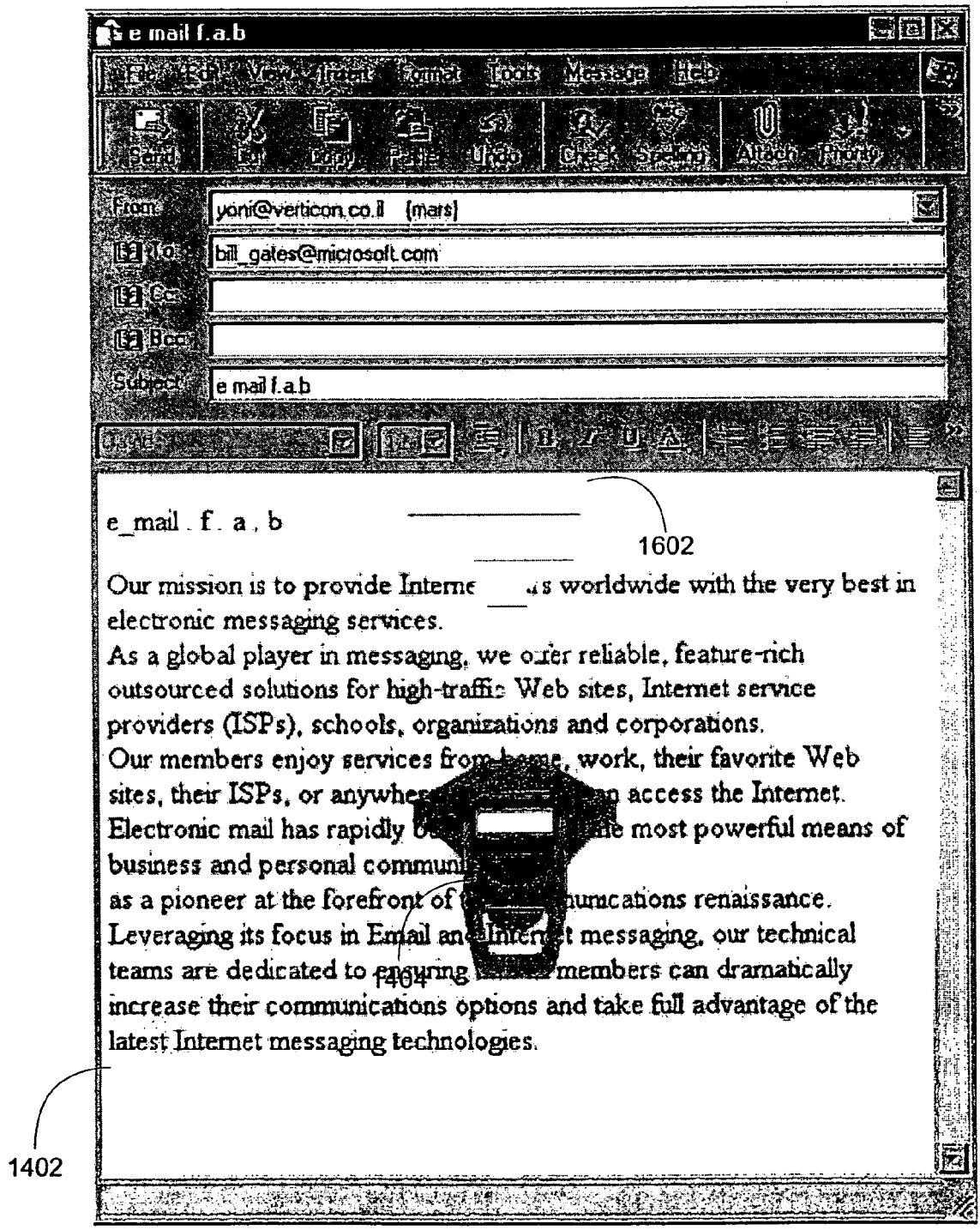
Figure 17:
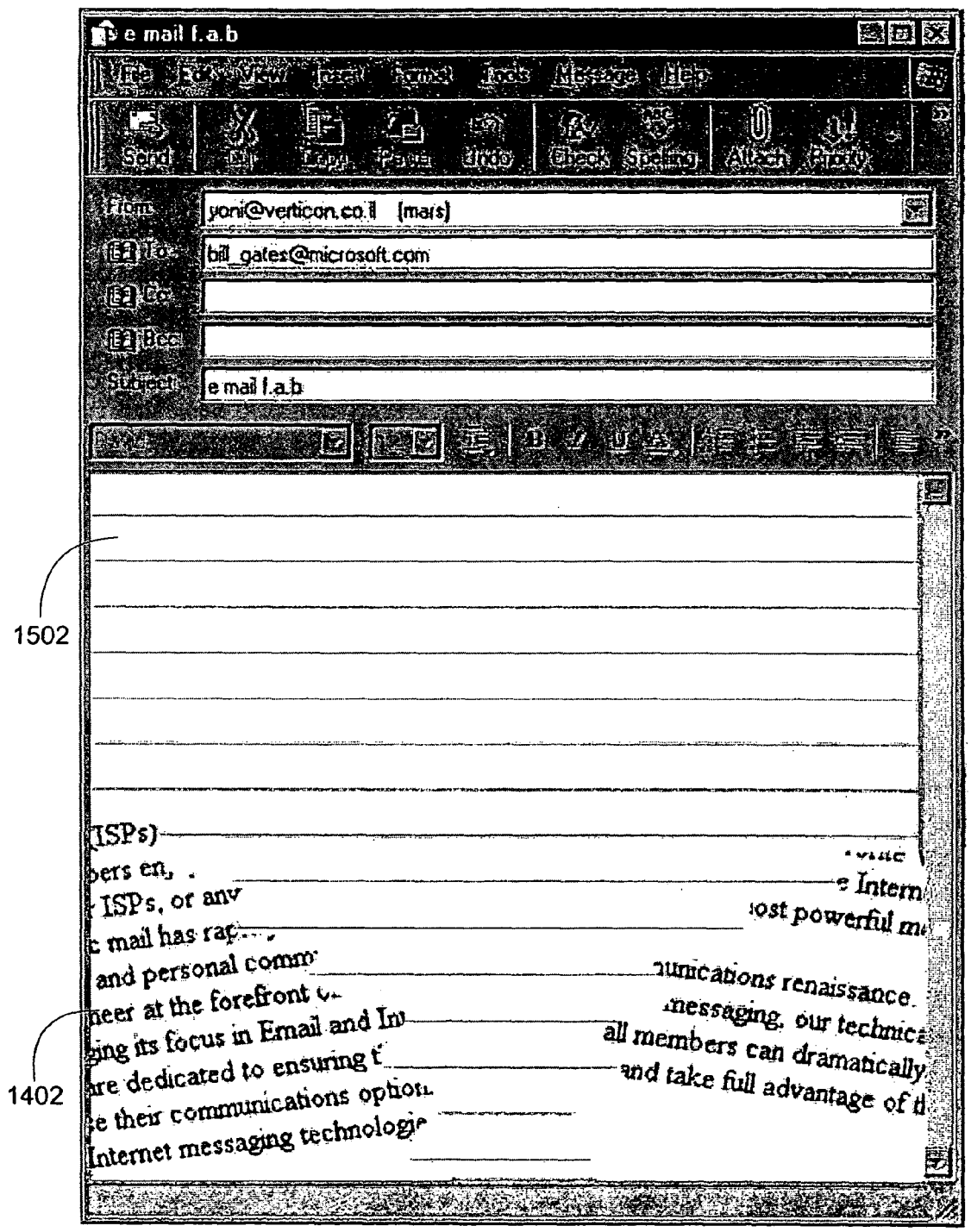
Figure 18:
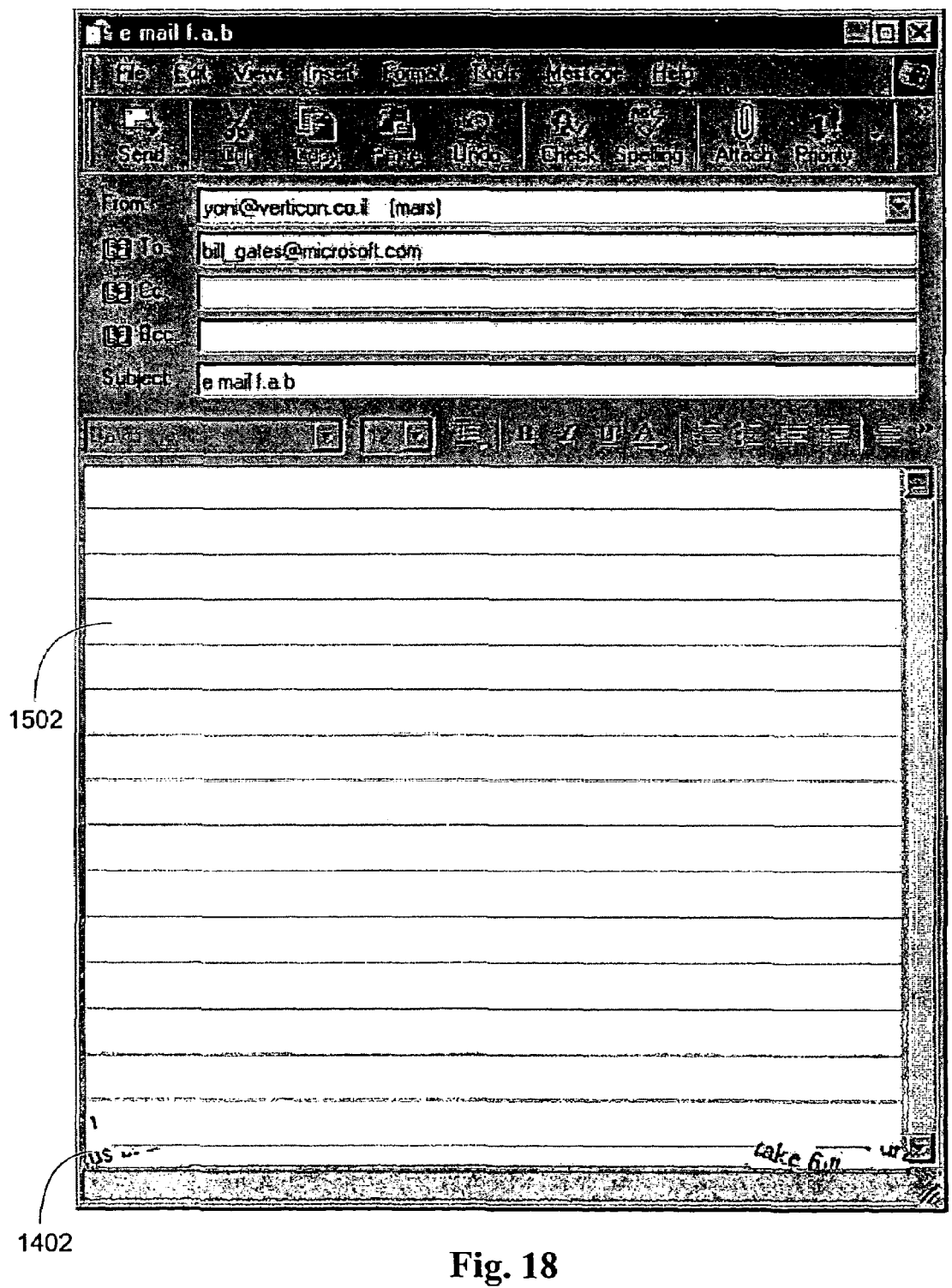
Figure 19:
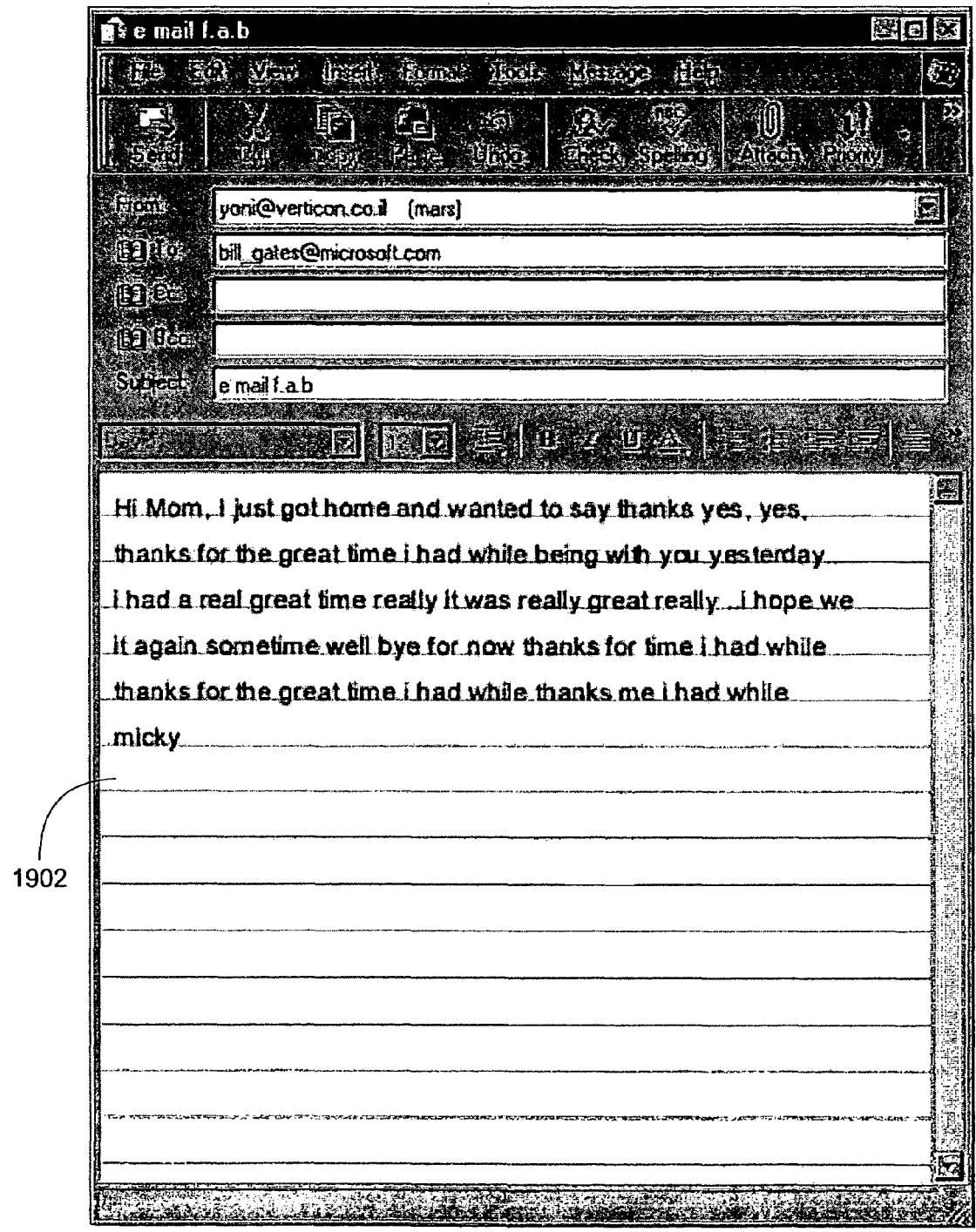
Figure 20:
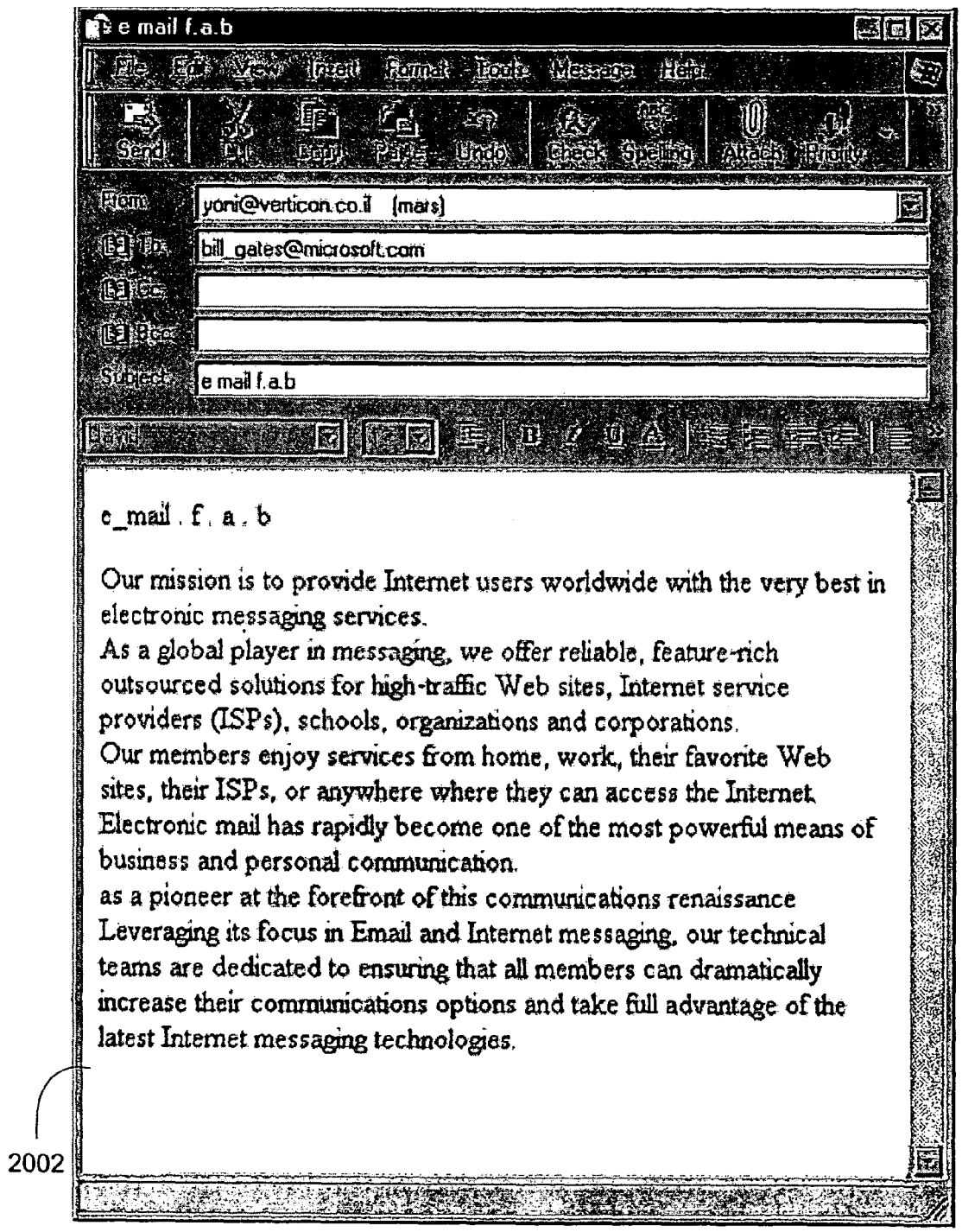
FIGS. 20 through 24 are a series of screen shots showing animation associated with executing the send message command according to one embodiment of the present invention.
Figure 21:
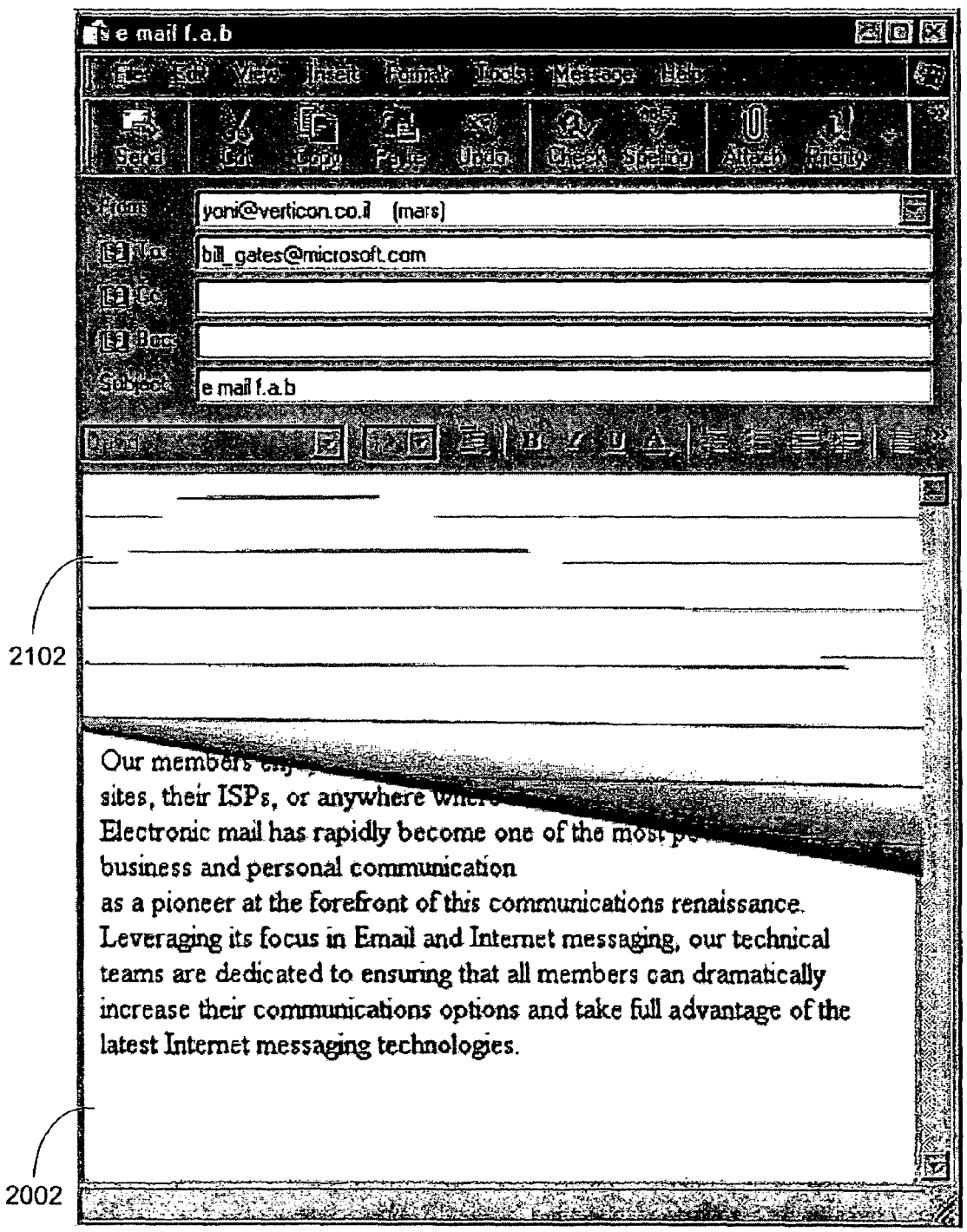
Figure 22:
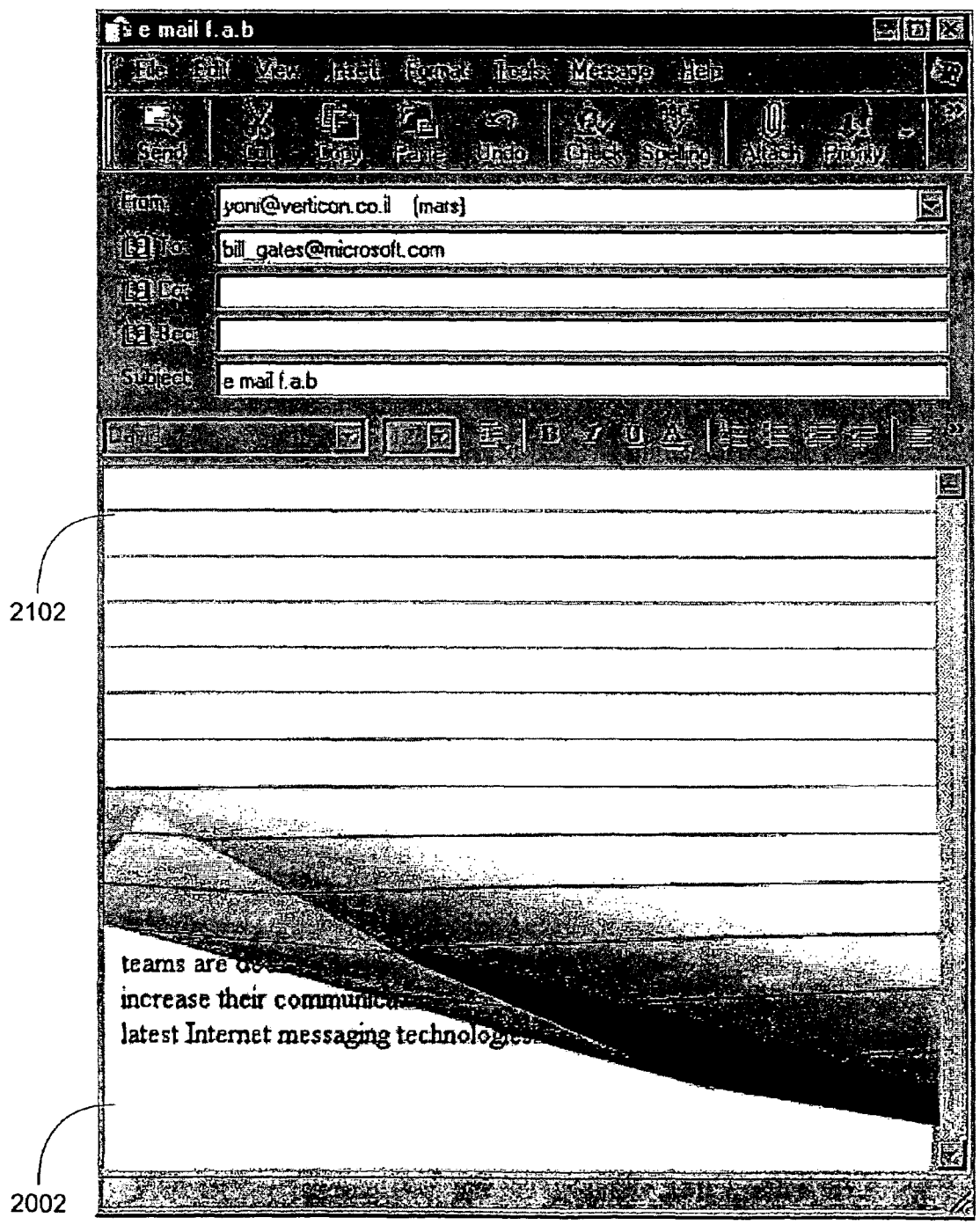
Figure 23:
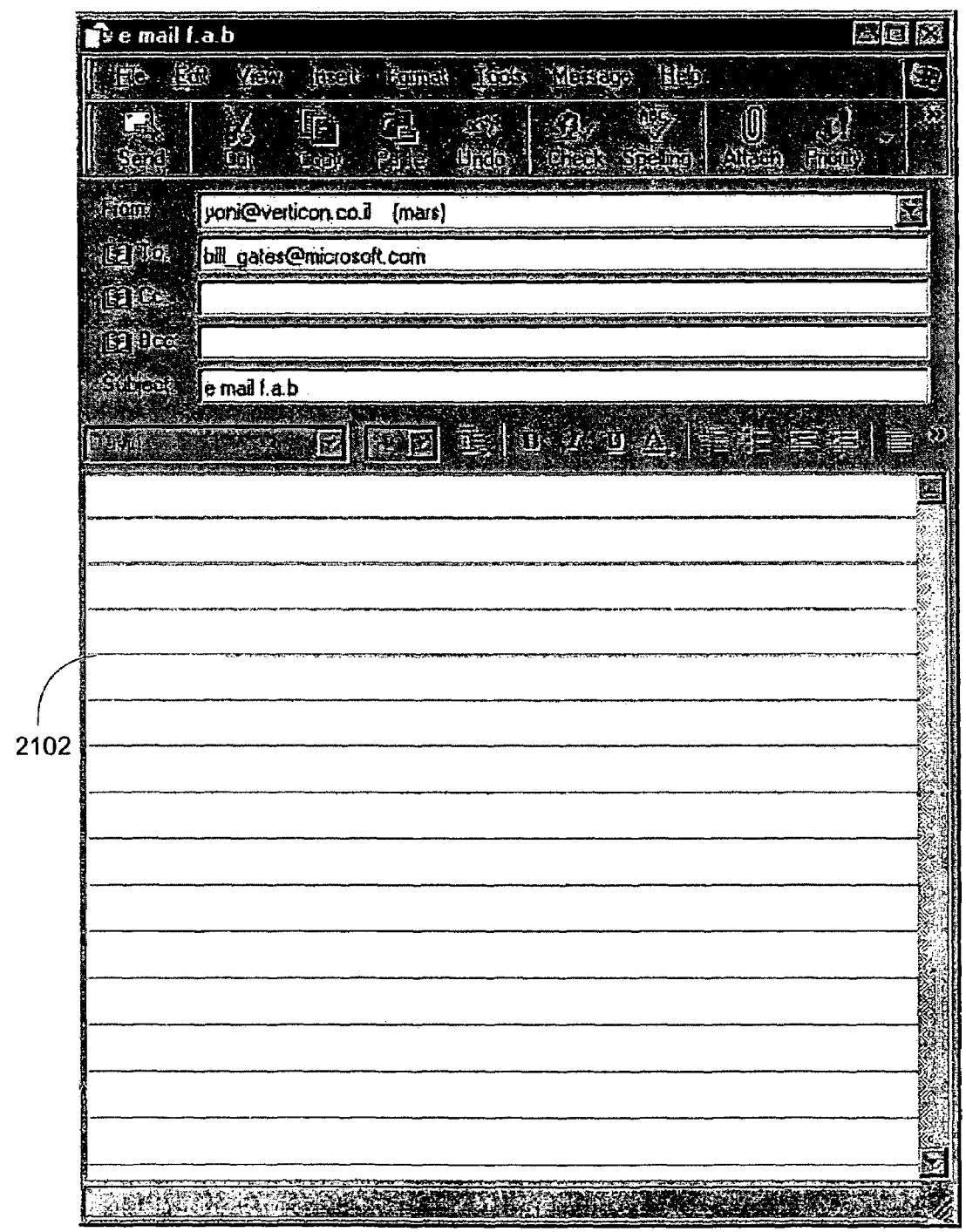
Figure 24:
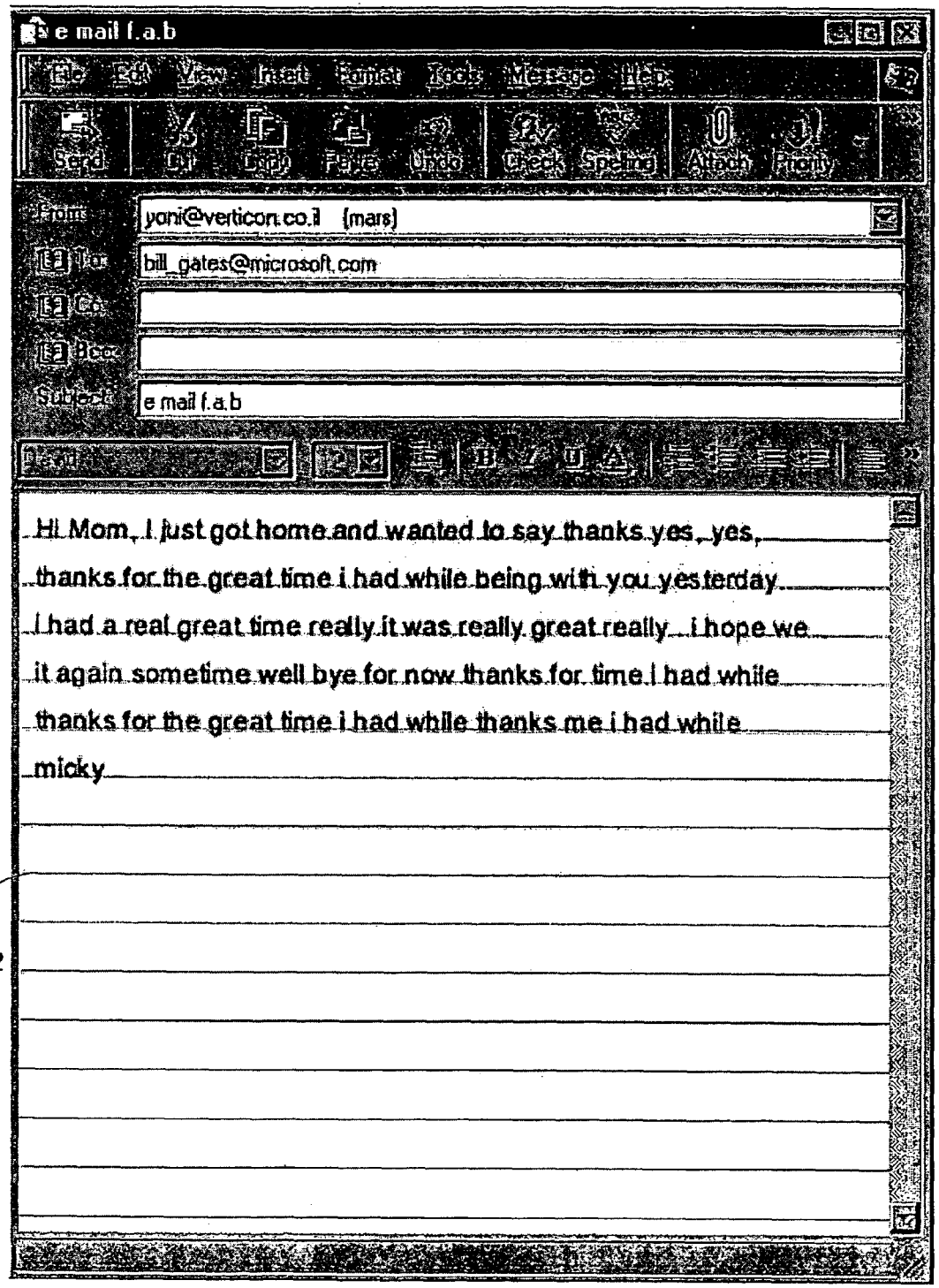

FIGS. 2 and 3 present a flowchart comprising a method for animating email messages in accordance with one embodiment of the present invention. When a user issues a command, it is received by the email client software and executed 202. The animation player will load the appropriate 3D animation from an animation file stored on the user's local filesystem 204. Alternatively, the animation files can reside on a networked server or within a Storage Area Network (SAN) that can be accessed by the email software. The 3D engine acts upon the animation file, which consists of mathematical data representing the movement of a set of polygons over a predefined timeline. The 3D engine animates the set of polygons in a particular manner, depending on the command executed.

The particular animation data file loaded can be chosen in a number of ways. The software can be set with default settings that specify the proper animation to use in response to a set of user commands. Alternatively, the user can be provided with options to decide the animation associated with each command. A third way of determining the proper animation is to associate different animations to various message themes. For example, a science fiction message theme might utilize a futuristic font on a background of stars. The system will associate a particular animation with this theme, such as blowing the message up in response to a delete command. Moreover, the user can develop additional animations or download animations from the Internet and collect a plurality of animations representative of each command. Alternatively, in cases where the user has collected several different animations for each command, the user can set the system to randomly load a different animation each time the command is executed.

The region that represents the body of the email message is captured 206. The body of the email is the object of the animation and is texture mapped 208 onto the animation is loaded in step 204. A texture map is an image that is applied to a polygon or polygons to be rendered on a display device. For example, a series of polygons could be arranged in the shape of a tree. Applying an image of a piece of bark to the polygon model so as to simulate a real tree would be an example of texture mapping. The polygon set can be considered an object's skeleton, whereas a texture map is its skin, made of wood, chrome, marble, glass, or any number of materials.

The animation is comprised of a set of polygons with the body of the message texture mapped to it. While the set of polygons are arranged in the shape of a rectangular body so as to appear identical to the actual message, "external bodies" may also be part of the animated scene. The polygons that comprise the external body, while animated with the animation of the message body, are external to the message.

The body of the message is applied as a texture map only to the subset of polygons that create the 3D representation of the email, and not the other subsets of polygons that comprise the external bodies. Any pre-defined color or texture mapping is applied to the external body. For example, a subset of polygons configured to resemble a zipper could be animated as part of the scene. The polygons that comprise the zipper, however, will have a set of pre-defined colors or textures mapped to them so they appear to resemble a zipper. By applying a separate texture map together with the right animation, the animation will appear to be that of a zipper being pulled across the message. Similarly, a set of polygons with a wood texture mapping could be configured to resemble a baseball bat. The animation can then be designed so as to have the email message animate into the form of a baseball with the baseball bat (i.e., the external body) hitting it off the screen.

Background image data must also be prepared 210. Background image data is the image presented to the user after the animation has completed. The background image is part of the animation and is used as a background to the animated scene. When the user is attempting to browse forward through a series of messages, the background image, or last frame of the animation, is the next message. Similarly, the last frame of the animation will be the previous message, displayed as a background image, when the user is attempting to browse backwards. The appropriate sound data for the animation is also loaded from a file 212 stored on a local or networked file system.

The dimensions of the body of the email message are calculated 302. The calculations are used to create a frameless window. This window is the area that is used to display the animation that was previously loaded at step 204. Because the body of the email is animating, the window and the animating body must be exactly the same size as the message so the user is not aware that a new window is being used to play the animation. The polygons that are being animated are also scaled to the dimensions of the window. Indeed, at either the first or last frame of the animation, depending on the command executed, the polygon set must be arranged in the shape of a rectangular body that is identical to the message body. Once the window has been created, it is displayed over the body of the email 304 and the texture-mapped polygons are animated 306. Once the animation has completed the frameless window is removed 308, revealing the background image prepared during step 210. The image data is then unloaded 310 and control is passed back to the email client software 312.

Table 1 presents animation, textures, and backgrounds as contemplated by the above-described method, according to one embodiment of the present invention.

TABLE 1

| | Animation starts with | Animation example | Animation ends with | Animation texture | Background |
| --- | --- | --- | --- | --- | --- |
| Send | The email that is about to be sent | The email folds, flies into space, and disappears | Application background | Capture of the email about to be sent | Application background |
| Receive (Open) | Application background | The same as send, but played backwards | The received (opened) email | Capture of the email about to be received | Application background |
| Next | The current email | A page turning in a book where the current email is turned over to reveal the next email | The next email if it exists, otherwise, Application background | Capture of the current email | The next email if it exists, otherwise, Application background |
| Previous | The current email | A page turning in a book where the previous email is turned over hiding the current email | The previous email if it exists, otherwise, Application background | Capture of the current email | The previous email if it exists, otherwise, Application background |
| Delete | The current email | The email crumbles/tears into pieces/shreds/shatters like glass to reveal the next email | The next email if it exists, otherwise, Application background | Capture of the current email | The next email if it exists, otherwise, Application background |

FIGS. 4 through 8 are a series of screen shots showing the animation associated with the execution of the send message command according to one embodiment of the present invention. The animation begins with a previously composed email message 402, which has been captured and texture mapped to the polygon set and displayed within the frameless window. Because the two are identical, the user is unaware that the message body has been covered or replaced with the frameless window. The polygons animate so the message appears to fall away from the user, revealing the background image 502. At this point, the message starts to slide away from the user, moving towards the "horizon" and revealing more of the application background 502 beneath the animation of the sent message 402, FIGS. 6 through 8.

Turning to FIGS. 9 through 13, a series of screen shots are presented that show the animation associated with the execution of the receive message command according to one embodiment of the present invention. The animation begins as a series of polygons in the shape of concentric square rings. The polygons have a texture map applied to them 902, which is derived from applying calculations on the incoming message. The application background is used by the animation as the background image 904. The concentric rings grow in size to reveal to the user that each square ring is a piece of the message, FIGS. 10 through 12. The polygon set animates such that the animation ends with the set arranged in the shape of the message body. The frameless window is seamlessly removed with the user viewing the actual message, FIG. 13.

FIGS. 14 through 19 present a series of screen shots that show the animation associated with the execution of the next message command according to one embodiment of the present invention. When the animation begins, the frameless window with polygons arranged in the shape of the message has been texture mapped and placed over the message body 1402. In addition, the frameless window contains an external body 1404 (a zipper). The animation progresses with the polygons moving to make the message appear as if it were being unzipped 1402. The external body, configured and texture mapped to resemble a zipper, moves across the message body. As the message animates, the partial calculation (background image only) of the next message 1602, used as the background to the animation, begins to come into view. After the external body and message have completed animating, the frameless window is seamlessly removed and the user is left with a view of the next message 1902, which contains the text as well.

Turning to FIGS. 20 through 24, a series of screen shots are presented that show the animation associated with the execution of the previous message command according to one embodiment of the present invention. The animation begins with a view of the current message 2002, which is captured and used as the animation background. The partial calculation (background only) of the previous message has been texture mapped to a set of polygons 2102 that begin to animate over the background image. As the polygons animate, the previous message comes into view. The animation completes with the polygon set arranged in the shape of the message body with the message body texture mapped to it. The frameless window is then removed, revealing the actual next message (including the text), and the user can execute additional commands.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for visually informing a user that a desired command has been executed by an email client, the method comprising:
   calculating an area within the email client that displays text of a message;
   mapping an identically sized set of texture mapped polygons to the area within the email client displaying the text of the message, the set of polygons texture mapped with a texture representing the text of the message;
   displaying the texture mapped polygons on top of the text of the message;
   animating the texture mapped polygons in response to a particular command a user wishes to execute; and
   removing the texture mapped polygons from the area within the email client displaying the text of the message.

2. The method of claim 1, the method comprising animating the set of texture mapped polygons to represent the message flying into space in response to the user executing a send message command to the email client.

3. The method of claim 1, the method comprising animating the set of texture mapped polygons to represent the message turning like a page in a book in response to the user instructing the email client to display a next message in a series of message.

4. The method of claim 1, the method comprising animating the set of texture mapped polygons to represent the message shredding in response to the user executing a next message command.

5. The method of claim 4, the method comprising animating the set of texture mapped polygons to represent the message crumbling in response to the user executing a delete command.

6. The method of claim 1, the method comprising generating a sound effect in response to the particular command the user wishes to execute.

7. The method of claim 1 wherein the animation used in the animation operation is not fixed.

8. The method of claim 7, the method comprising randomly associating different animations with the particular command the user wishes to execute.

9. The method of claim 1, the method comprising supplying additional animations for presentation during the animation operation.

10. The method of claim 1, the method comprising
    generating a set of polygons representing an external body;
    texture mapping a desired texture to the set of polygons representing the external body;
    displaying the external body; and
    animating the external body in conjunction with the step of animating the texture mapped polygons in response to the particular command the user wishes to execute.

11. The method of claim 10, the method comprising generating multiple external bodies.

12. The method of claim 10, the method comprising generating a sound effect in response to the particular command the user wishes to execute.

* * * * *